United States Patent [19]

Gabrysch

[11] Patent Number: 4,574,586

[45] Date of Patent: Mar. 11, 1986

[54] SELF COMPENSATING DUCTED ROCKET MOTOR FUEL NOZZLE AND METHOD FOR REGULATING FUEL GENERATION

[75] Inventor: Leslie P. Gabrysch, Hewitt, Tex.

[73] Assignee: Hercules Incorporated, Wilmington, Del.

[21] Appl. No.: 580,580

[22] Filed: Feb. 16, 1984

[51] Int. Cl.[4] .............................................. F02K 9/56
[52] U.S. Cl. ...................................... 60/254; 137/79; 137/468; 251/57
[58] Field of Search ................ 60/251, 250, 253, 591, 60/254, 234; 137/79, 468; 251/57, 112; 138/46, 42; 236/99 R, 93 A

[56] References Cited

U.S. PATENT DOCUMENTS

| | | | |
|---|---|---|---|
| 1,231,164 | 6/1917 | Jahns et al. | 251/112 X |
| 2,379,124 | 6/1945 | Wasson | 137/79 X |
| 2,573,522 | 10/1951 | Watt | 137/79 X |
| 2,990,119 | 6/1961 | Willson | 236/99 R |
| 3,529,420 | 9/1970 | Guyot | 60/251 X |
| 3,648,967 | 3/1972 | O'Neill et al. | 251/57 |
| 4,214,698 | 7/1980 | Josefsson | 236/42 |
| 4,355,663 | 10/1982 | Burkes et al. | 138/44 |
| 4,442,669 | 4/1984 | Burkes et al. | 60/251 |
| 4,444,006 | 4/1984 | Burkes, Jr. et al. | 60/251 |

FOREIGN PATENT DOCUMENTS

| | | | |
|---|---|---|---|
| 1189819 | 3/1965 | Fed. Rep. of Germany | 137/79 |
| 1304582 | 10/1962 | France | 138/46 |

Primary Examiner—Carlton R. Croyle
Assistant Examiner—Jeffrey A. Simenauer
Attorney, Agent, or Firm—John E. Crowe

[57] ABSTRACT

Method and device for continuously and automatically maintaining optimal control settings for rich fuel gas generation within the pre-starting, starting, and operational modes of a ducted solid fuel rocket motor, through actual or potential control of pressure within a fuel rich gas generator by use of a temperature sensitive hydraulic/mechanical choke, the mechanical component of which comprises an expansion bellows endwise attached to a spring-biased slidable nozzle valve throat blockage element, and the hydraulic component comprises a temperature-sensitive constant volume fluid reservoir, or its equivalent.

9 Claims, 6 Drawing Figures

SELF COMPENSATING DUCTED ROCKET MOTOR FUEL NOZZLE AND METHOD FOR REGULATING FUEL GENERATION

The U.S. Government has rights in this invention pursuant to Contract No. F33615-80-C-2055 awarded by the U.S. Air Force.

This invention relates to a method for automatically maintaining a constant flow of propellant gas generated or to be generated for use in a ducted rocket motor under widely varying temperature conditions; and a corresponding temperature sensitive hydraulic/mechanical choke regulating device suitable for installation between a fuel-rich solid propellant gas generator and a secondary combustor, said choke device achieving the desired results by regulation of pressure within the fuel-rich solid propellant gas generator as determined by the temperature of the solid propellant.

BACKGROUND

Solid fuel ducted rockets suffer performance degradation when operated under fuel-grain soak temperatures substantially different from baseline design conditions.

In general, such rockets rely on a fuel-rich solid propellant gas generator and a secondary combustion chamber whereby propellant gas or fuel gas generated from a solid substrate is fed through one or more interconnecting passages or throats to the secondary combustion chamber where it is combined with an oxidant to complete combustion and provide propulsive power thrust for the rocket.

Generation of such fuel-rich gas at the desired rate is difficult to optimize in such rockets (a) because of changing needs for propulsion power, the optimal amounts of fuel rich gas at any one time more or less depending upon the intended flight path of the rocket, and (b) because of sensitivity of the solid fuel mass flow rate to the solid propellant fuel grain temperature when using a constant nozzle throat area. These factors translate into performance penalties in the form of greater-than-necessary motor thrust margins, based on the lowest expected solid propellant temperatures, to assure adequate fuel gas flow rate.

It is an object of the present invention to minimize the need for excessive motor thrust margins and to obtain an energy efficient light weight, durable hydraulic/mechanical choke regulating device for continuously and automatically controlling actual and potential fuel gas generating rates within a solid fuel ducted rocket.

THE INVENTION

This invention relates to a temperature sensitive hydraulic/mechanical choke regulating device for optimizing constant fuel gas generation within a ducted solid fuel rocket motor, said device comprising (A) an insulated flow section adapted for feedably connecting a fuel gas generating chamber having a body of solid fuel therein, with a secondary combustion chamber within a ducted rocket motor, the flow section being connected to the above elements by inlet and outlet fuel gas flow ports and a flanged regulator port. Pressure within the gas generating chamber is regulated through the flanged regulator port at a point conveniently arranged intermediate to the fuel gas flow ports, all three ports being common to a throat section within the flow section;

(B) a stem section endwise secured in gas tight relation to the insulated flow section, at the flanged regulator port, the stem section comprising
  (a) a fluid activated bellows assembly,
  (b) blocking means adapted to partially obstruct the flow of fuel gas to the secondary combustion chamber, the blocking means being slidably reciprocally mounted within the stem section and at least partly insertable through the flanged regulator port into the throat section without completely blocking gas flow, such as a cylindrical or similar solid geometrically shaped plunger capable of close insertion through the flanged regulator port into the throat;
  (c) linking means connecting a fluid activated bellows mounted within the bellows assembly to the blocking means, and
  (d) biasing means inclusive of spring biasing means such as a compression spring mounted within the stem section in opposition to expansion of the fluid activated bellows and withdrawing movement of the blocking means from the throat section; and (C) temperature sensing means comprising a fluid receptacle containing hydraulic fluid having a high coefficient of thermal expansion, such means being thermally responsive to the ambient temperature of the body of solid fuel in the fuel gas generating chamber. Such means are either
  (a) externally arranged with respect to the stem section in the form of a constant volume reservoir with expansion overflow handled by external connecting means such a fluid connecting line secured to feed channels within the fluid activated bellows assembly leading to the fluid activated bellows, or
  (b) the fluid active bellows itself is not insulated and is allowed to also act as the temperature sensing means in place of an external constant volume reservoir.

In this manner an increase in fuel grain temperature above a preset point will cause expansion of the hydraulic fluid, with corresponding expansion movement of the fluid activated bellows and resulting withdrawal movement of the blocking means from the throat section of the device in opposition to the biasing means.

The new position assumed by the blocking means will, upon firing of the rocket, assure a pressure lowering effect in fuel gas pressure within the fuel gas generating chamber to obtain a slower constant generation of fuel gas best suited for the ambient temperature of the solid fuel within the fuel gas generating chamber.

The actual amount of rise in actual or potential pressure within the fuel gas generator chamber (with corresponding increase in fuel gas generation) is largely determined by the diameter and degree of increased insertion of the blocking means such as a cylindrical shaped plunger into the throat passage in response to the biasing means when the temperature of the solid fuel grain temperature is less than a pre-set minimum.

The device of the present invention is more fully illustrated and its operating principles explained in FIGS. 1-6 in which:

FIG. 1 is a longitudinal section, partially broken away of a self-contained hydraulic/mechanical valving and regulating device of the present invention in which temperature-induced fluid expansion or contraction within temperature sensing means in the form of a constant volume fluid filled reservoir is utilized to respond to ambient temperature changes representative of the solid fuel within a fuel gas generator chamber (shown in part), through movement of a blockage element shown as a plunger (36) to control the actual or potential fuel gas pressure within the schematically represented gas generating chamber (66) having a body of solid fuel (68) to assure a constant optimal fuel gas flow rate into a partially shown schematically represented secondary combustion chamber (70) at any temperature within a pre-determined range.

Figure 6:
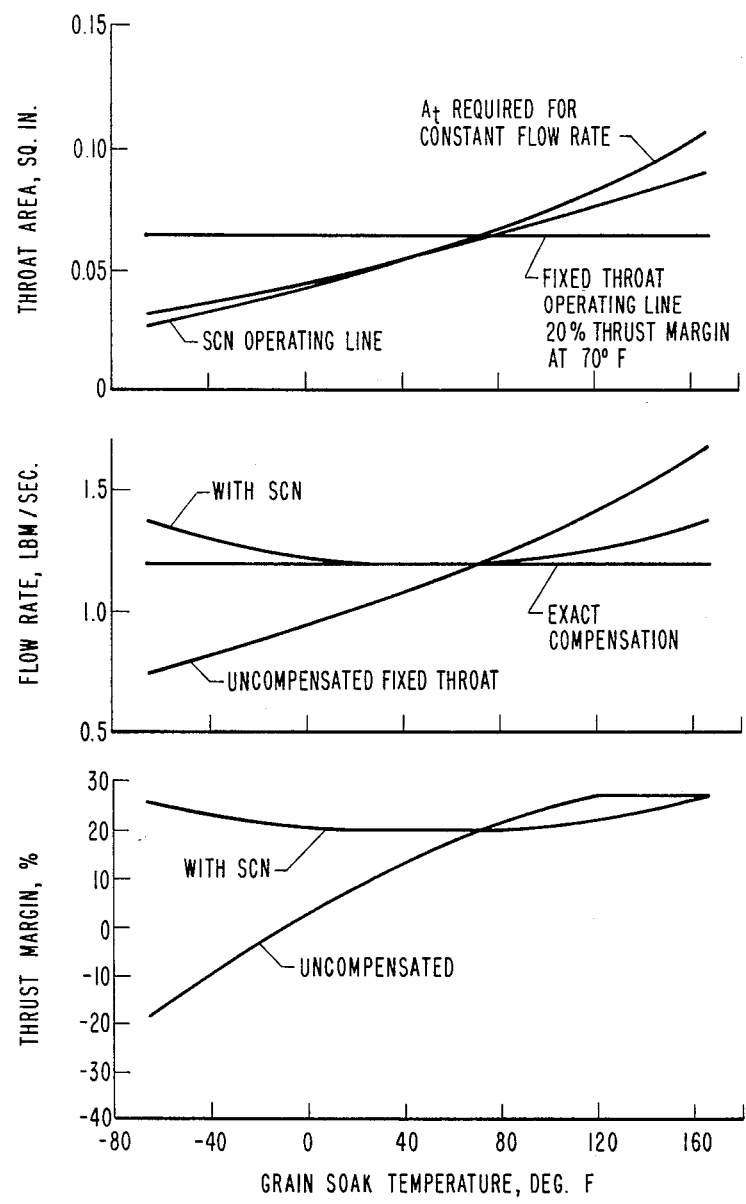

FIG. 6, consists of three graphs which demonstrate (1) the required theoretical changes in throat area ($A_t$) (in the upper graph) needed to maintain a constant gas flow rate within a ducted solid fuel rocket motor. The SCN (self compensating nozzle) operating line demonstrates the closeness of the instant device in this regard. The third (linear horizontal graph) demonstrates an expected fuel gas flow using a fixed throat area and optimal constant 70° F. temperature of the solid fuel grain.

(2) the middle graph demonstrates the relative ineffectiveness of an uncompensated fixed throat configuration in attempting to maintain a desired constant fuel gas flow rate over an ambient temperature range of −65° F. to +165° F., as compared with the instant device (SCN curve), both being compared with an arbitrarily set optimum represented by the linear horizontal graph.

Since variation in excess flow rate in the middle graph is relatively small using the SCN configuration of the present invention, it is now possible to design a system safely using a lower thrust margin (lower than the 20% arbitrarily set in the upper graph of FIG. 6) and still assure an adequate constant fuel gas flow over the full −65° F. to +165° F. estimated ambient temperature range;

(3) the bottom graph of FIG. 6 further demonstrates the difficulty encountered in avoiding wasteful over production of fuel gas when using an uncompensated fixed throat configuration in order to also assure adequate fuel gas for rocket operation when faced with possible ambient temperatures variations within the −65° F. to 70° F. as compared with a relatively constant thrust margin maintainable over the same temperature range under SCN configuration.

DETAILED DESCRIPTION OF THE DRAWINGS

Figure 1:
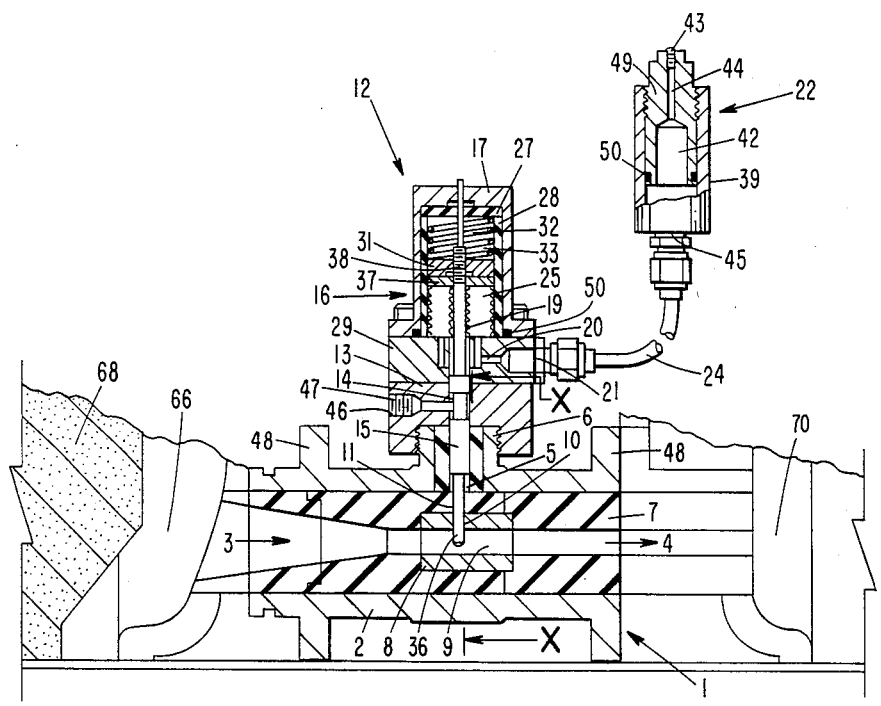

FIG. 1 illustrates a hydraulic/mechanical valving and regulating device comprising, in combination, (A) a flow section (1) of general cylindrical shape but properly of other suitable external geometric shape flowably positioned between a fuel gas generating chamber having a body of solid fuel therein and a secondary combustion chamber (shown in longitudinal section), said flow section being defined by a housing wall (2) with outside flanges (48), opposed inlet and outlet gas flow ports (3)(4), and regulator port (5), framed by threaded insulated port flange (6), said flow section being lined with an inert tapered heat-resistant insulator liner (7) and an erosion-resistant sleeve (8) concentrically internally embedded in said insulator liner to form a throat section (9); said heat resistant insulator liner (7) and sleeve (8) having ports (11)(10) in register with regulator port (5), providing access to throat section (9) for partial blockage of the throat area;

(B) a stem section (12) comprised of a locking cap (13) secured to said port flange (6) by internal threading; a fluid activated bellows assembly (16), inclusive of a bellows plate (29) face-wise contiguous with the locking cap (13), an end-mounted fluid-activated bellows (25) endwise secured to the opposite face of the bellows plate (29) in fluid feedable relation thereto, a linking means comprising a bellows guide plate (37) attached to the opposite end of the fluid activated bellows (25), a plunger retainer plate (31) contiguous with said bellows guide plate, (37), a bellows assembly cover (17) having an insulated top (27) and internal insulation liner (28) edgewise peripherally secured at the open end to the bellows plate (29), and spring biasing means shown in the form of a compression spring (32) internally mounted between the plunger retainer plate (31) and the inside surface of insulated top (27) of said bellows assembly cover; the stem section internally defining lower, middle, and upper longitudinal cavities (14)(19)(33) and endwise secured to flow section (1) in gas tight relation around a threaded insulated regulator port flange (6) at regulator port (5), the axis of said stem section being in general perpendicular arrangement with respect to the corresponding axis of the flow section; the locking cap (13) and the insulation liner of the regulator port internally defining lower longitudinal cavity (14) to provide guiding means for a slidably reciprocally mounted plunger (36) endwise secured to plunger retainer plate (31) and extending within the lower, middle, and upper longitudinal cavities (14, 19, 33), and insertable into throat (9) through regulator port (5) of the flow section, to regulate actual or potential fuel gas pressure within the gas generating chamber to obtain optimal constant fuel gas generation in response to the ambient fuel grain temperature; said stem section additionally having plunger locking means (46) for limiting and securing the movable plunger as desired, such means being here demonstrated as a threaded locking screw (47) set for travel perpendicular to the path of said plunger (36); the locking cap (13) being further secured at one face to the fluid activated bellows assembly (16), which, comprises bellows plate (29), forming a base for end-mounted fluid activated bellows (25), the bellows plate preferably incorporating fluid feed channel (20) feedably connected at one end to said bellows (25) and in feedable register at the opposite end through side feed port (21) to an external constant volume fluid reservoir (22) through external connecting means shown as line (24), said bellows plate being additionally peripherally secured along its upper face to a flanged open side of said bellows assembly cover (17) having an internal insulation liner (28) which defines the upper longitudinal cavity (33), and which contains the fluid activated bellows (25), with an endwise attached bellows guide plate (37) having a diameter small enough to permit reciprocal movement within said upper longitudinal cavity, whereby upward movement is imparted from said bellows guide plate (37) to a disc-shaped plunger retainer plate (31) of equal diameter secured to the shaft of reciprocally moveable valve plunger (36) through a threaded retainer port (38); guide plate (37) and plunger retainer (31) being biased in the downward (plunger insertion) direction by spring biasing means in the form of compression spring (32) mounted within said upper longitudinal cavity, between said plunger retainer plate (31) and the inside top (27) of said bellows assembly cover (17); at no time, however, does plunger (36) or any counterpart completely block the gas flow passage or throat defined by flow ports 3 and 4; and (C) temperature sensing means here shown as a heat conductive fluid receptacle in the form of a variable constant volume fluid reservoir (22) which is preferably in indirect thermal contact with the body of solid fuel, the reservoir and external connecting means (24) and fluid feed channel (20) being filled with a hydraulic fluid of high coefficient of thermal expansion, said reservoir as shown, being defined by inner and outer walls (39)(49), a central fluid chamber (42) and a fluid bleed screw (43) inserted into internally threaded pressure adjustment port (44) at the upper end of central fluid chamber (42), with expansion port (45) located at the opposite end in feedable relation to bellows assembly (16) through external connecting means (24) and fluid feed channel (20); whereby a rise in environmental temperature and the fuel grain temperature of said solid fuel and said expandable fluid within said temperature responsive means, effects an expansion of bellows (25) through volumetric expansion and movement of the fluid from constant volume fluid reservoir (22) into fluid activated bellows (25), moving bellows guide plate (37) and plunger retainer plate (31) and attached movable plunger upwardly in opposition to biasing compression spring (32), and thereby effecting withdrawal of plunger (36) from throat section (9) to encourage a fuel gas pressure drop in the fuel gas generator chamber with resulting drop in constant rate of fuel gas delivery to the secondary combustion chamber or a ramburner (not shown); while exposure of the constant volume fluid reservoir (22) to a lowering in ambient fuel grain temperature results conversely, in volumetric contraction or reduction of the hydraulic fluid volume, reducing opposition to biasing compression spring (32) and causing plunger retainer plate (31) and attached plunger (36) to move the plunger downward into throat section (9), with resulting increase in gas pressure within said fuel gas generator chamber in operational mode. Such increase, as noted above, encourages the faster generation of fuel gas (see FIG. 6) and helps, maintain a desired optimal constant flow rate outlet through gas flow port (4) and to the secondary combustor.

Figure 2:
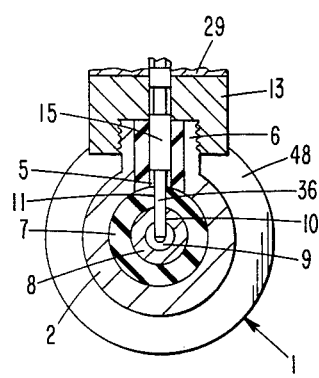
FIG. 2 is a partial broken away cross section along line X—X of the device represented in FIG. 1, showing part of stem section (12), all component parts common to FIGS. 1 and 2 bearing the same arabic numerical identification.

FIG. 2 illustrates a partial longitudinal section of flow section (1) along axis lines X—X of the device shown in part in FIG. 1, illustrating housing wall (2), heat-resistant insulator liner (7), and concentric embedded erosion resistant sleeve (8), defining a throat section at regulator port (5) (not shown), showing plunger guide sleeve (15) and part of reciprocally movable plunger (36).

Figure 3:
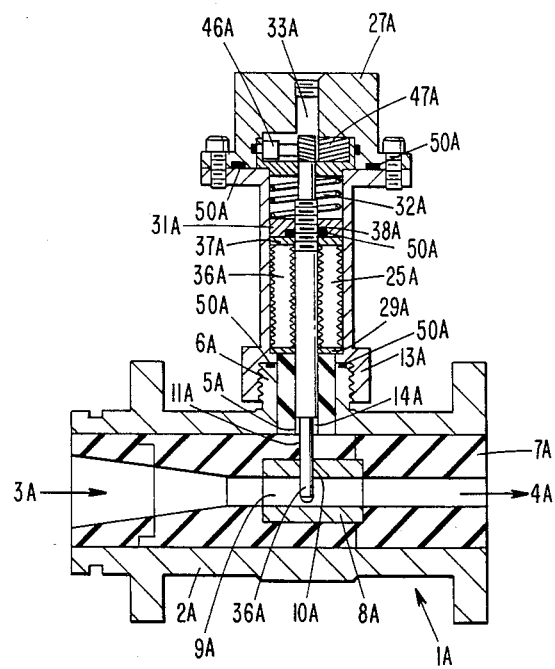
FIG. 3 is a modification of the device represented in FIG. 1, also in longitudinal section, in which the functional role of the constant volume fluid reservoir (22) of FIG. 1 is replaced by a dual-functioning expandable fluid-filled metal bellows (25A), common arabic numbers again denoting identical or functionally similar components.

FIG. 3, as above noted, is a structural modification of the device represented in FIG. 1 in which elements of the same arabic number correspond to the same or functionally similar elements. Here, the fluid-filled metal bellows (25A) carries out a dual functional purpose, both as a fluid receptacle or reservoir and as an operative element for imparting reciprocal movement in response to ambient temperature changes; in this figure, plunger (36A) is machined so as to provide a tight clearance within regulator port (5A) and within lower and middle longitudinal cavities (14A, 19A), without use of a guide sleeve as shown in FIG. 1. In addition, a plunger locking means is located within the bellows assembly cover at the upper longitudinal cavity (33A) in the form of a Dimple Motor (46A), the locking means comprising locking blocks (47A) (shown in fully closed position) to immobilize or limit the travel of plunger (36A) if desired, prior to motor ignition.

Figure 4:
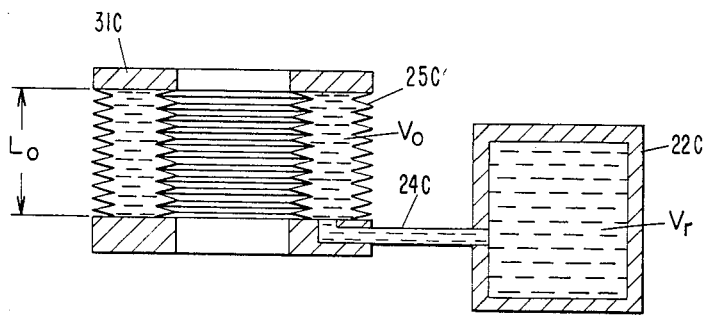
FIG. 4 is a diagrammatic representation of the relationship between a constant volume reservoir of the type illustrated in FIGS. 1 and 2, in which is contained a suitable hydraulic fluid of volume ($V_r$) and a flexible metal bellows (25C) containing a variable volume ($V_o$) of the hydraulic fluid.
Figure 5:
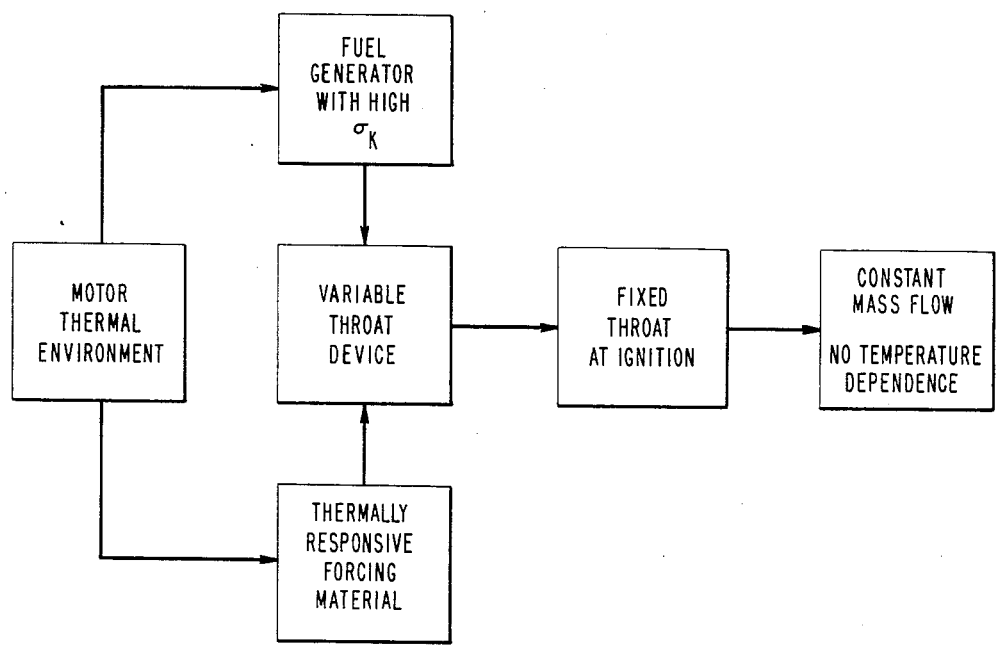
FIG. 5 is a general diagram of the functional centers and primary variables governing operation of the hydraulic/mechanical choke regulating device of the instant invention.

FIG. 4 is a diagrammatic representation of the temperature activated hydraulic mechanism represented in FIGS. 1 and 2 whereby a change in ambient temperature promotes corresponding change in the fluid volume in the system causing fluid flow through connecting means (24C) into or from flexible bellows (25C), resulting in movement of plunger retainer plate (31C) and attached plunger (not shown) to effect a movement of the plunger in the throat section (not shown), resulting in a drop or increase in actual or potential fuel gas pressure in the fuel gas generator chamber (not shown), to maintain a constant optimal rate of fuel gas generation at any particular fuel grain soak temperature.

Due to the near incompressibility and high volumetric coefficient of thermal expansion of the hydraulic fluid utilized, the fluid-bellows system of the present invention permits a surpisingly substantial plunger movement or stroke length as temperature varies between $-65°$ F. and $160°$ F. Total plunger movement can be shown to be directly proportional to the active length of the temperature sensitive element. By utilizing a fixed volume reservoir in conjunction with a metal bellows, the active height, $L_o$, of the fluid activated bellows is minimized by placing a major portion of the fluid volume in an externally located constant volume reservoir (22C). All changes in fluid volume due to temperature, therefore must occur in the bellows or moveable portion of the system.

It is extremely important that the fluid in such a system be sealed or contained so as to eliminate any leaks or seepage which would adversely influence performance and calibration over a period of time.

The basic design of a system such as demonstrated in FIG. 4 is conveniently represented, for instance, by the following equations, the effect of temperature on the reservoir itself and flow lines being omitted for purpose of illustration:

$$V = V_T \phi \Delta T$$

where $V_o$ = volume of fluid in bellows in.$^3$
$V_R$ = volume of fluid in the Reservoir and connecting flow lines
$V_T = V_o + V_R$ = Total Fluid Volume; (in.$^3$);
$\phi$ is the Volumetric Expansion Coefficient in.$^3$/in.$^3$deg F.;

ΔT is the Temperature Change in deg. F. from an initial reference;

$$\Delta L = \frac{\Delta V}{A_o} = \frac{(V_o + V_R)\phi \Delta T}{A_o} \text{ — Plunger Movement, in.}$$

where

A$_o$—the Effective Annular Area of the Bellows in in.$^2$

Hydraulic fluids suitable for use in the present invention must be relatively inert and remain liquid and nonviscous within an effective temperature range of about −65° F. to 165° F. Such fluids include, for instance, silicone fluids, such as Dow-Corning's DC 200 (Trademark of Dow Corning) and DC 510 (Trademark of Dow Corning), or similar liquid compositions. It is important, in each case, that the hydraulic fluid have an adequate thermal coefficient of volumetric expansion ($\phi$) to obtain the desired results. The manufacturer's values in the above-named commercial fluids are found to be $\phi = 600 \times 10^{-6}$ in.$^3$/in.$^3$ deg F. for DC 200, and $\phi = 533 \times 10^{-6}$ in.$^3$/in.$^3$ deg F. for DC 510.

At a given temperature, flow of fuel gas from the fuel gas generator chamber is conveniently defined by the formula $$\dot{W} = \frac{A_t P_c g_c}{C^*}$$

in which throat area (A$_t$) and chamber pressure (P$_c$) and to a lesser extent, the characteristic exhaust velocity (C*) of the propellant, vary while the gravitational constant (g$_c$) remains constant. The relationship between A$_t$, P$_c$, and C* must remain relatively constant to assure a constant fuel flow rate at any given temperature over the operating temperature range illustrated in FIG. 6. The results are derived from standard solid propellant rocket motor ballistics for a typical fuel generator propellant utilizing a self-compensating nozzle as opposed to a fixed throat nozzle.

The valving and regulating device of the present invention employs translational motion of the valve plunger to maintain constant fuel gas generation and flow over a wide temperature range.

The nozzle/valve component of this invention however, must be so designed as to isolate seals, bearings, and temperature reactive components from contact with hot fuel gases while using insulating and erosion resistant materials within the critical throat area.

In particular, the throat blockage element described herein as the plunger (36) and the erosion resistant sleeve (8) of FIG. 1 which define, in part, the flow channel and valving for hot fuel rich products flowing from a gas generator chamber to a secondary combustor; as such, they must be erosion resistant and have high temperature strength and low thermal expansion within a temperature and pressure environment of about 2000° F. at 2000 psi. Suitable materials include compositions of titanium, zirconium and molybdenum (TZM), and tungsten rhenium alloys such as (W-25RE), or tantalum tungsten alloys such as (TA-10W).

The insulator liners employed in the nozzle/valve device of the present invention are preferably prepared from silica-phenolic materials. Such include pressure molded silica-phenolic materials available commercially, for instance, from Fiberite Corporation, of Winona, Minn. A particularly suitable silica-phenolic insulator is, for instance, MX 2646 molding compound. Carbon-phenolic molded insulators (are also available from Fiberite Corporation) are additionally found satisfactory.

Seals employed in the device of the present invention are preferably selected from the same type of material used under the temperature and pressure conditions encountered in operation of the ducted rocket motor in which the nozzle/valve of this invention is employed. Elastomeric O-rings, for instance, are usefully made from materials such as ethylene propylene terpolymers or from silicone rubber.

Face seals (50) (50A) are preferably solid copper gaskets, copper crush gaskets or metal C-rings made from similar resistant material such as Inconal X-750, preferably those with silver or nickel plating. Such seals are also available commercially from UAP Components, Inc.

High pressure welded metal bellows seals such as used herein are also available commercially from Sealol, Inc. and from The Metal Bellows Corp.

What is claimed is:

1. A continuous automatic temperature sensitive hydraulic/mechanical control choke regulating device comprising, in combination,
    (A) an insulated flow section adapted for feedably connecting a fuel gas generating chamber having a body of solid fuel therein, with a secondary combustion chamber within a ducted rocket motor, said insulated flow section having inlet and outlet fuel gas flow ports and a regulator port arranged intermediate said gas flow ports, all being common to a throat section within said flow section;
    (B) a stem section endwise secured to the insulated flow section at said regulator port and comprised of
        (a) a bellows assembly comprising a fluid-activated bellows,
        (b) blocking means slidably reciprocally mounted within said stem section and at least partially insertable through said regulator port into said throat section without completely blocking gas flow,
        (c) linking means connecting the fluid-activated bellows within said bellows assembly to said blocking means, for imparting movement to said blocking means, and
        (d) biasing means mounted within said stem section in opposition to expansion of said fluid-activated bellows and withdrawing movement of said blocking means from said throat section; and
    (C) temperature sensing means comprising a fluid receptacle containing hydraulic fluid, said temperature sensing means being
        (a) externally arranged with respect to said stem section and flowably secured to said bellows by fluid connecting means, or
        (b) coincident with said bellows, said temperature sensing means being thermally responsive to the ambient temperature of the body of solid fuel in said fuel gas generating chamber;
    whereby increasing fuel grain temperature within said solid fuel effects expansion of hydraulic fluid and said bellows directly, or indirectly by fluid flow through said fluid connecting means, causing withdrawal movement of said blocking means by said linking means, in opposition to said biasing means, potentially lowering fuel gas pressure within said gas generating chamber with slower constant generation of fuel gas; the opposite effect being achieved upon a drop in ambient fuel grain temperature, favoring volume contraction of said hydraulic fluid with corresponding direct or indirect contraction of said bellows in favor of said biasing means, causing increased insertion of the blocking means into the throat section with corresponding potential increase in gas pressure within said fuel gas generating chamber and corresponding potential increase in constant generation of generated fuel gas.

2. The choke regulating device of claim 1 in which the fluid activated bellows and bellows assembly are not insulated and act as the temperature sensing means.

3. The hydraulic/mechanical valving and regulating device of claim 2 wherein the temperature sensing means is incorporated wholly within the stem section.

4. The choke regulating device of claim 2 in which the stem section contains a locking means for immobilizing the blocking means as desired.

5. The hydraulic/mechanical valving and regulating device of claim 4 wherein said valve plunger locking means comprises locking blocks and a Dimple Motor located within the bellows assembly cover.

6. A continuous automatic temperature sensitive hydraulic/mechanical control choke regulating device comprising, in combination, (A) an insulated flow section adapted for feedably connecting a fuel gas generating chamber having a body of solid fuel therein, with a secondary combustion chamber within a ducted rocket motor, said insulated flow section having inlet and outlet fuel gas flow ports and a regulator port arranged intermediate said gas flow ports, all being common to a throat section within said flow section;

(B) a stem section endwise secured to the insulated flow section at said regulator port and comprised of
(a) a bellows assembly comprising a fluid-activated bellows,
(b) blocking means slidably reciprocally mounted within said stem section and at least partially insertable through said regulator port into said throat section without completely blocking gas flow,
(c) linking means connecting the fluid activated bellows within said bellows assembly to said blocking means, for imparting movement to said blocking means, and
(d) biasing means mounted within said stem section in opposition to expansion of said fluid-activated bellows and withdrawing movement of said blocking means from said throat section; and (C) temperature sensing means comprising a constant volume fluid receptacle containing hydraulic fluid flowably secured to said fluid activated bellows by fluid connecting means, said temperature sensing means being external to said stem section and thermally responsive to the ambient temperature of the body of solid fuel in said fuel gas generating chamber;

whereby increasing fuel grain temperature within said solid fuel effects expansion of hydraulic fluid and fluid flow through said fluid connecting means, causing expansion of said bellows and withdrawal movement of said blocking means from said throat section in opposition to said biasing means, potentially lowering fuel gas pressure within said gas generating chamber with slower constant generation of fuel gas; the opposite effect being achieved upon a drop in ambient fuel grain temperature, favoring volume contraction of said hydraulic fluid with corresponding contraction of said bellows in favor of said biasing means, causing increased insertion of the blocking means into the throat section with corresponding potential increase in gas pressure within said fuel gas generating chamber and corresponding potential increase in constant generation of fuel gas.

7. The choke regulating device of claim 6 wherein the blocking means is a cylindrical shaped plunger, the biasing means is a compression spring, and the stem section is arranged in general perpendicular arrangement with respect to the axis of said insulated flow section.

8. The choke regulating device of claim 6 in which the stem section contains a locking means for immobilizing the blocking means as desired.

9. The hydraulic/mechanical choke regulating device of claim 8 wherein the locking means is locking screw rotatably inserted within an internally threaded part in potential locking contact with the blocking means in the form of a cylindrical shaped plunger.

* * * * *